(12) United States Patent
Andino et al.

(10) Patent No.: US 6,997,428 B1
(45) Date of Patent: Feb. 14, 2006

(54) CONTACT LENS MOLD

(75) Inventors: Rafael Victor Andino, Lawrenceville, GA (US); Mayuresh Shashikant Tapale, Atlanta, GA (US); Christopher John Brooks, Glen Head, NY (US); Walter Ray Stoeckman, Mahopac, NY (US); Donald Fraser VanRoyen, New York, NY (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/524,990

(22) Filed: Mar. 14, 2000

Related U.S. Application Data
(60) Provisional application No. 60/198,232, filed on Mar. 31, 1999.

(51) Int. Cl.
*B29D 11/00* (2006.01)

(52) U.S. Cl. .................. 249/134; 425/174.4; 425/808; 264/1.38

(58) Field of Classification Search ............. 425/174.4, 425/450.1, 808; 249/117, 134; 264/1.36, 264/1.38
See application file for complete search history.

(56) References Cited

U.S. PATENT DOCUMENTS

| | | | | |
|---|---|---|---|---|
| 4,166,088 A | | 8/1979 | Neefe .......................... 264/1 |
| 4,701,288 A | * | 10/1987 | Cook et al. ................. 264/1.4 |
| 4,702,574 A | * | 10/1987 | Bawa ........................ 351/162 |
| 4,732,715 A | * | 3/1988 | Bawa et al. ................. 264/1.4 |
| 5,053,171 A | * | 10/1991 | Portney et al. ............. 264/1.4 |
| 5,160,749 A | * | 11/1992 | Fogarty ...................... 425/412 |
| 5,254,000 A | * | 10/1993 | Friske et al. ................ 425/595 |
| 5,269,867 A | | 12/1993 | Ari ............................. 264/1.4 |
| 5,782,460 A | * | 7/1998 | Kretzschmar et al. ...... 264/1.36 |
| 5,989,462 A | * | 11/1999 | Buazza et al. .............. 264/1.36 |
| 6,071,111 A | * | 6/2000 | Doke et al. ................. 425/412 |

FOREIGN PATENT DOCUMENTS

| | | |
|---|---|---|
| EP | 0 322 353 A2 | 12/1988 |
| EP | 0 637 490 A1 | 7/1994 |

OTHER PUBLICATIONS
Standard Search Report ; dated Sep. 24, 1999.

* cited by examiner

*Primary Examiner*—Donald Heckenberg
(74) *Attorney, Agent, or Firm*—Robert J. Gorman; Jian S. Zhou

(57) ABSTRACT

An ophthalmic lens mold includes a first mold half having a front side and a back side. The front side defines an optical surface. A second mold half has a front side defining an optical surface. Upon alignment of the first mold half with respect to the second mold half so that the front sides oppose each other, a mold cavity is formed between the front sides to form an ophthalmic lens therein from a moldable material. The first mold half includes a first section that transmits curing light and that extends from the back side to the front side. The first section includes at an area of the first mold half optical surface enclosed by an outermost circumference of the ophthalmic lens. A second section is co-molded with the first section and blocks the light. The second section is disposed with respect to the first section so that the second section prevents the curing light incident to the-back side from passing through the first mold half into an area of the mold cavity extending from the first mold half front side to the second mold half front side surrounding and extending radially outward of a boundary that includes the ophthalmic lens circumference and so that the first section passes the incident light to an area of the mold cavity bounded by and within the boundary.

20 Claims, 10 Drawing Sheets

CONTACT LENS MOLD

This application claims priority of the provisional patent application No. 60/198,132 having a priority date of Mar. 31, 1999, which application was converted to a provisional application by petition, based on non-provisional application Ser. No. 09/282,915, filed Mar. 31, 1999.

BACKGROUND OF THE INVENTION

The present invention is directed to an ophthalmic lens mold. More specifically, the invention is directed to an improved ophthalmic lens mold.

The circumferential edge of an ophthalmic lens, e.g., contact lens or intraocular lens, is critical in that irregularities in this edge can cause discomfort to the eye and/or to the eyelid as it passes over the edge. It is also important that the edge create a smooth transition as the eyelid moves from the eye to the lens to prevent unwanted lens movement.

Ophthalmic lenses are often made by cast molding, in which a monomer material is deposited in a cavity defined between optical surfaces of opposing halves of a lens mold. Great care is taken in some mold designs to create a knife edge about one of the mold's optical surfaces to precisely form the critical contact lens edge when the mold halves are brought together.

In another arrangement, a mask that is opaque to ultraviolet light is deposited on one of the mold halves about its optical zone to block UV light during curing of the contact lens. The edge of the mask defines the edge of an area in the mold cavity in which monomer can be polymerized and, therefore, forms the ophthalmic lens edge.

Referring to FIG. 1, a contact lens mold 10 includes a back curve mold half 12 and a front curve mold half 14 defining respective optical surfaces 16 and 18. Mold halves 12 and 14 are secured in a mold tray (not shown) and brought together, as indicated by arrow 20, so that a mold cavity is defined between surfaces 16 and 18 into which a monomer material is deposited to form a contact lens.

Referring also to FIG. 2, back curve mold 12 includes a transparent core, e.g., quartz core, 22 surrounded by a metal sleeve 24. An opaque mask, e.g., a metallic mask, 26 is deposited about optical surface 16 and forms an edge 28 thereabout. Front curve mold 14 includes another tranparent core surrounded by a metallic sleeve.

When monomer is deposited into the mold cavity, collimated ultraviolet light is directed through the back of mold half 12. The transparent core passes the light to an area of the mold cavity bounded by a cylinder defined by edge 28, thereby curing the monomer in this area. The mask, however, is opaque to ultraviolet light, and monomer radially outward of the area defined by edge 28 does not cure. The UV light is collimated, and there is a precise transition from cured to uncured material at the cylindrical boundary, which therefore determines the edge of the molded contact lens. The unpolymerized material may be rinsed away upon separation of the mold halves.

SUMMARY OF THE INVENTION

The present-invention recognizes and addresses disadvantages of prior art constructions and methods.

Accordingly, it is an object of the present invention to provide an improved ophthalmic lens mold, e.g., contact lens mold.

More particularly, it is an object of the present invention to provide a contact lens mold capable of establishing a circumferential edge of a molded ophthalmic lens.

These objects are achieved by an ophthalmic lens mold having a first mold half having a front side and a back side and a second mold half having a front side. The front side of each of the first and second mold halves defines an optical surface. Upon alignment of the first mold half with respect to the second mold half so that the front sides oppose each other, a mold cavity is formed between the front sides to form a contact lens therein from a moldable material, so that the optical surfaces form respective opposing optical surfaces of the ophthalmic lens. The first mold half includes a first section that transmits curing light and that extends from the back side to the front side. The first section includes at least an area of the first mold half optical surface enclosed by an outermost circumference of the ophthalmic lens. A second section is co-molded with the first section and blocks the light. The second section is disposed with respect to the first section so that the second section prevents curing light incident to the back side from passing through the first mold half into the area of the mold cavity extending from the first mold half front side to the second mold half front side surrounding and extending radially outward' of a boundary that includes the ophthalmic lens circumference and so that the first section passes the incident light to an area of the mold cavity bounded by and within the boundary.

A preferred embodiment of the method according to the present invention includes injecting a molten moldable first material to fill a first mold cavity. The first mold cavity defines a center section for forming a mold half center section of substantially uniform thickness and that defines an optical surface having a circular circumferential edge. The first material transmits curing light when solidified and is injected through a gate radially offset from the mold cavity center section with respect to the axis of the circumferential edge. The first material is cooled to form a first section of the contact lens mold. A moldable second material is injected to fill a second mold cavity through a gate radially offset from the mold half center section. The second mold cavity extends about the mold half center section radially outward of a boundary parallel to the axis and including the circumferential edge. The second cavity meets and completely surrounds the boundary. The second material blocks the curing light when solidified. Hereinafter, for illustration purposes, the present invention is described with contact lenses and contact lens molds although the present invention can be used for various ophthalmic lenses.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings in which:

FIG. 10b is a cross-sectional illustration of the mold as in FIG. 10a;

FIG. 10c is a cross-sectional illustration of the mold as in FIG. 10a; and

Figure 1:
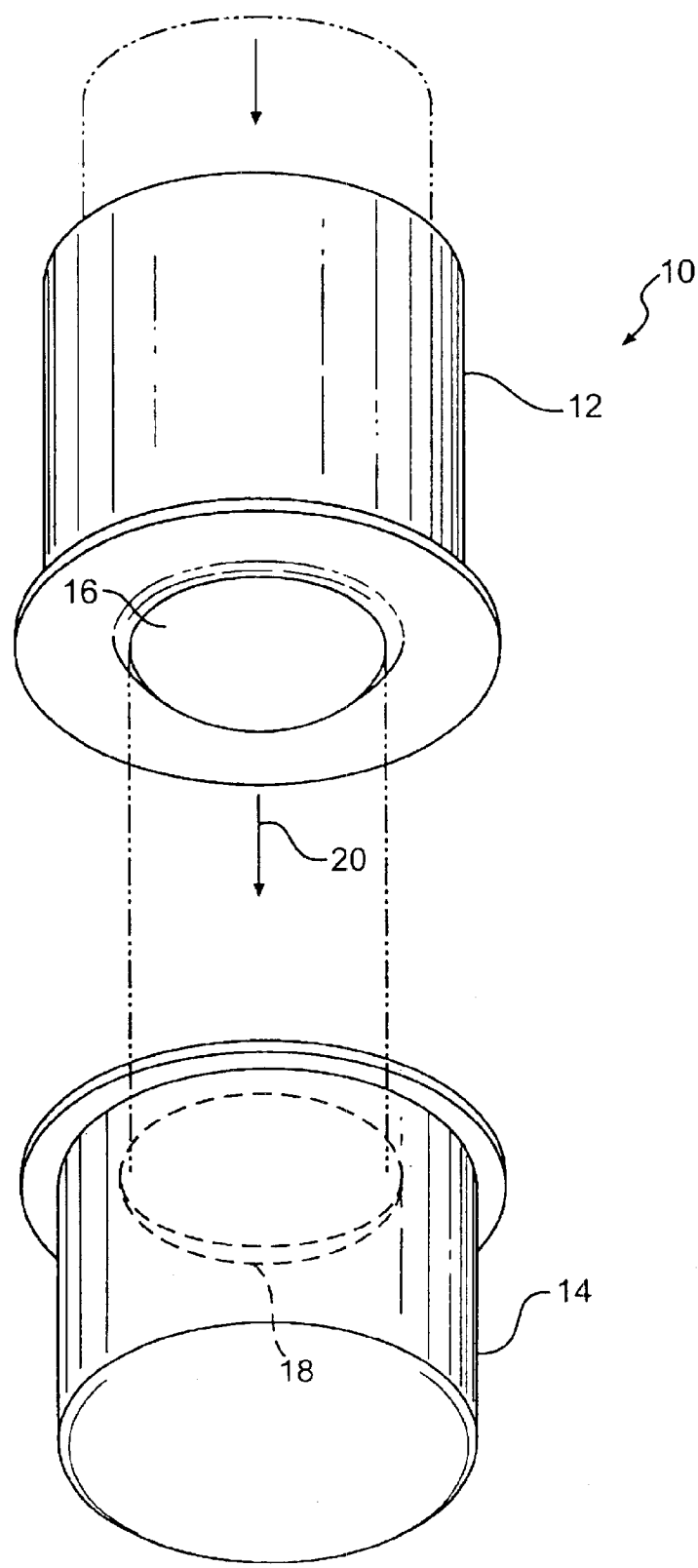
FIG. 1 is a perspective view of a prior art contact lens mold.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
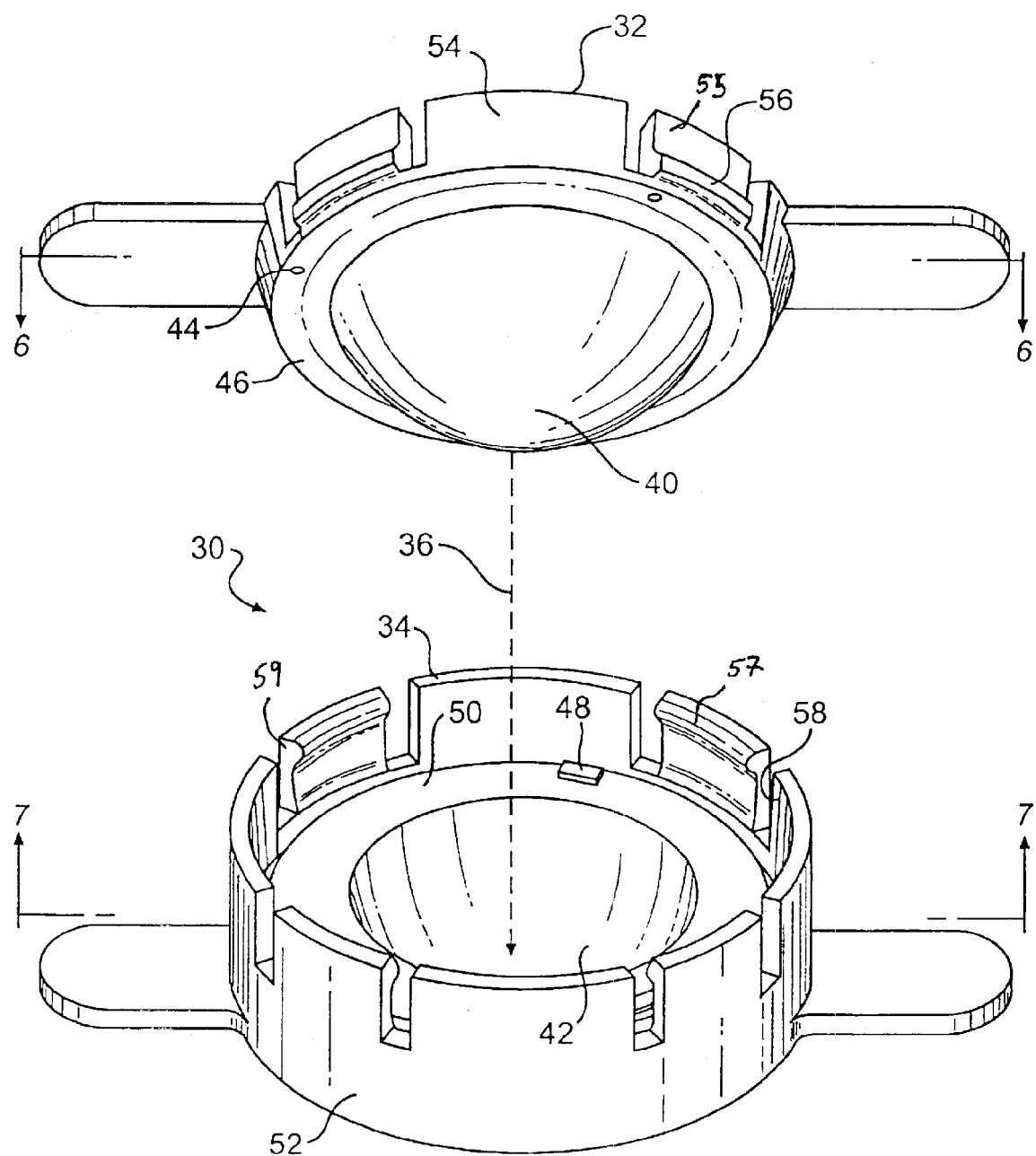
FIG. 3 is a perspective view of a contact lens mold according to an embodiment of the present invention.

Referring to FIG. 3 a contact lens mold 30 includes a back (or "base") curve mold half 32 and a front curve mold half 34 which may be brought together as indicated by arrow 36 to form a mold cavity 38 (FIG. 8) between optical surfaces 40 and 42. While contact lens surfaces typically define areas such as, for example, the "optica" zone and "lenticular" zone, the entire lens front curve surface and the entire lens base curve surface are referred to herein as optical surfaces which are formed by the "optica" surfaces of the contact lens mold. Thus, the lens mold's "optical" surfaces as referred to herein may include those surfaces that form contact lens optical surfaces, including the optical and lenticular zones.

Base curve mold half 32 includes a plurality of protrusions 44 extending forward of a front side 46 of mold half 32. Protrusions 44 bear on complementary protrusions 48 extending forward of a front sides 50 of mold half 34 to offset optical surface 40 a predetermined distance from optical surface 42 to form the mold cavity and thereby help determine the thickness of a lens formed therein. Mold half 34 includes an annular collar 52 that receives an annular collar 54 of mold half 32. Annular collar 54 includes a plurality of protrusions 56 extending radially outward from tabs 55. Protrusions 56 bear against an inner surface 58 of collar 52 when the mold halves are assembled in their operative position to center optical surface 40 with respect to optical surface 42. It should be understood, however, that mold half 32 may be formed without protrusions 44 so that the mold halves bear on each other about the optical surfaces to form the mold cavity. Similarly, protrusions 56 may be omitted where collars 52 and 56 are dimensioned to receive each other in a radially aligned fit.

In the embodiment shown in FIG. 3, mold half 34 receives mold half 32 by a snap fit such that a separate claiming device is not required to hold the mold halves in a properly closed position. It is to be noted that the lens mold halves can be produced without the snap feature. Annular collar 52 includes protrusions 57 extending radially inward from tabs 59. As the mold halves are brought together, opposing protrusions 56 and 57 ride over each other so that tabs 55 and 59 respectively deflect inwardly and outwardly. Once protrusions 56 move past protrusions 57, the tabs return to their original position so that the opposing protrusions thereafter resist separation of the mold halves. In particular, protrusions 57 bear on protrusions 56 when the mold halves are together, and mold half 34 thereby applies a clamping pressure to mold half 32 to maintain optical surface 40 in position opposite optical surface 42 to define a suitable mold cavity therebetween.

Figure 4:
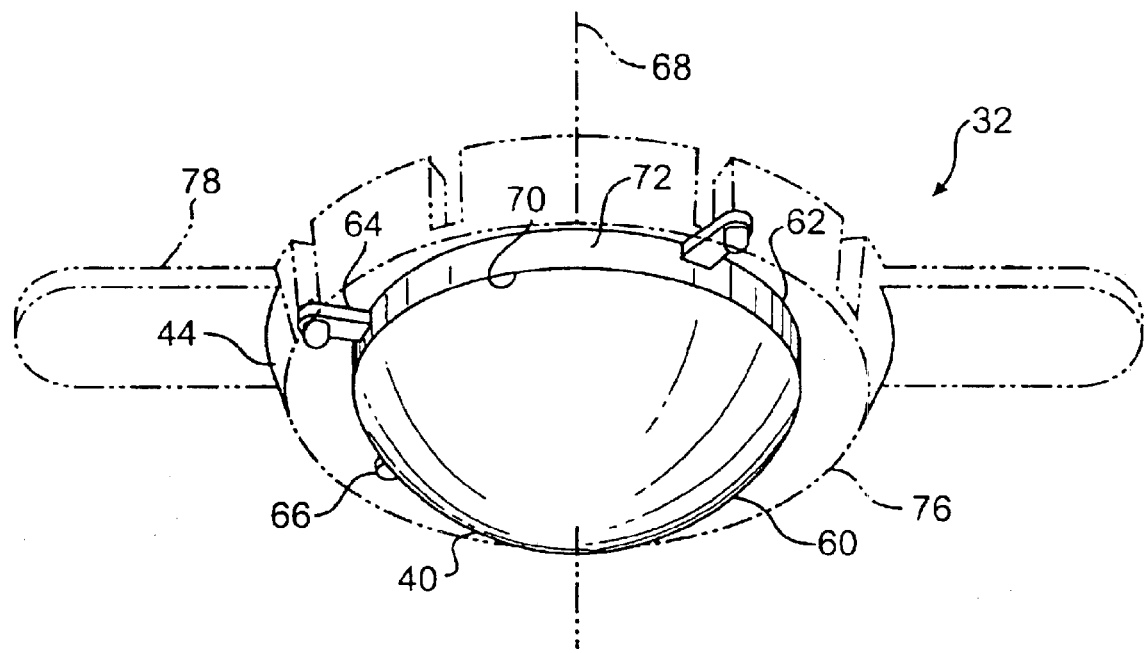
FIG. 4 is a partial perspective view of a base curve mold half as shown in FIG. 3.

Referring to FIG. 4, back curve mold half 32 includes a first section 60 including a center section 62, a plurality of tabs 64 from which protrusions 44 extend, and a tab 66. Center section 62 includes optical surface 40.

As described in more detail below, first section 60 may be formed by an injection molding process. Because optical surface 40 is a critical surface, it is preferred not to inject the molten material directly into that surface. Molten material in the illustrated embodiment is therefore injected into the mold cavity through a gate radially offset from optical surface 40 with respect to an axis 68 of the circumferential edge 70 of optical surface 40. The mold cavity path from the injection point to center section 62 forms the gate. Solidified material in this path forms tab 66, which is also referred to herein as the gate.

Figure 6:
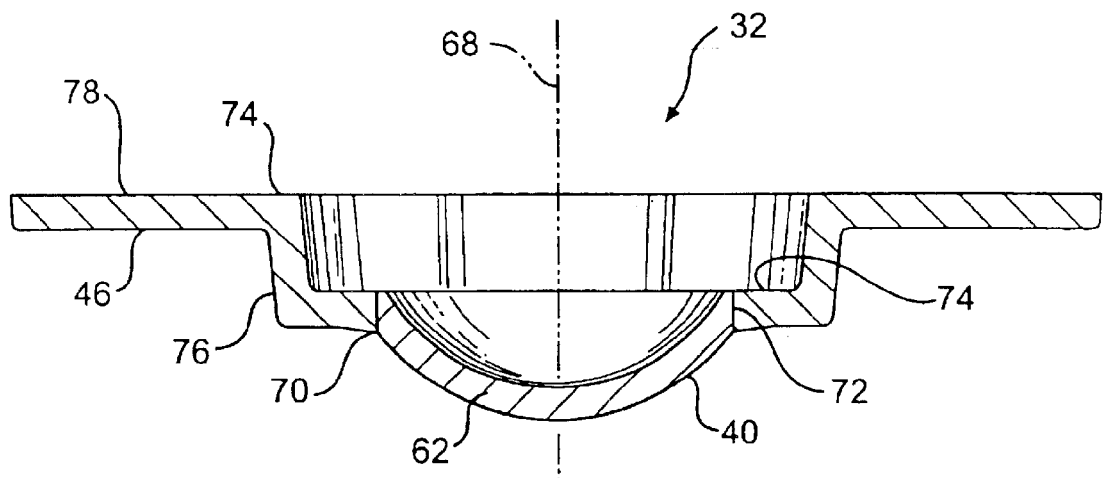
FIG. 6 is a cross-sectional view of the base curve mold half as shown in FIG. 3 taken along the line 6—6.

Referring also to FIG. 6, center section 62 defines a boundary 72 parallel to axis 68 that extends from a back side, 74 of mold half 32 to front side 46 and that includes edge 70. A second section 76 of mold half 32 is injection molded about the first section. Second section 76 meets and completely surrounds boundary 72. As indicated in FIG. 4, tabs 64 and 66 extend radially outward of boundary 72 into second section 76. Thus, second section 76 need not form a continuous annular inner diameter surface entirely between front side 46 and back side 74 at boundary 72. Second section 76 may, for example, include discontinuous section that meet and together completely surround the boundary to prevent curing light from passing through the second section. Thus, by "meeting and completely surrounding" boundary 72, second section 76 prevents any such light parallel to axis 68 and radially outward of and immediately adjacent to boundary 72 from passing through second 76.

Figure 5:
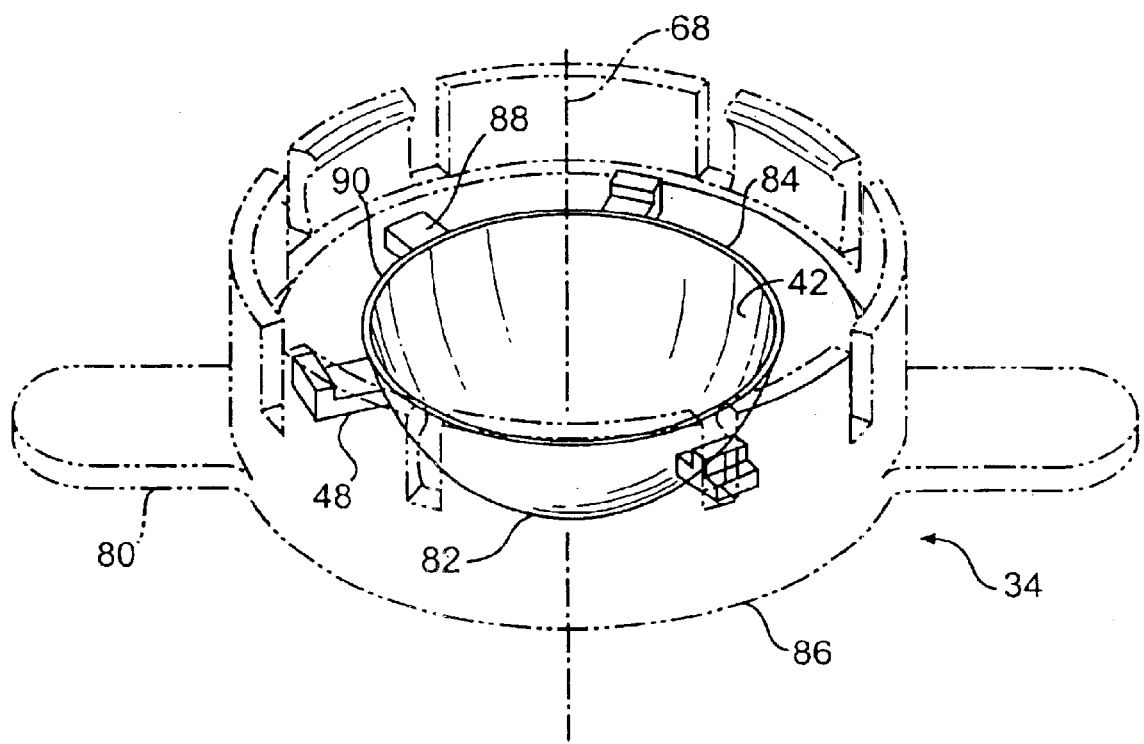
FIG. 5 is a partial perspective view of a front curve mold half as shown in FIG. 3.
Figure 7:
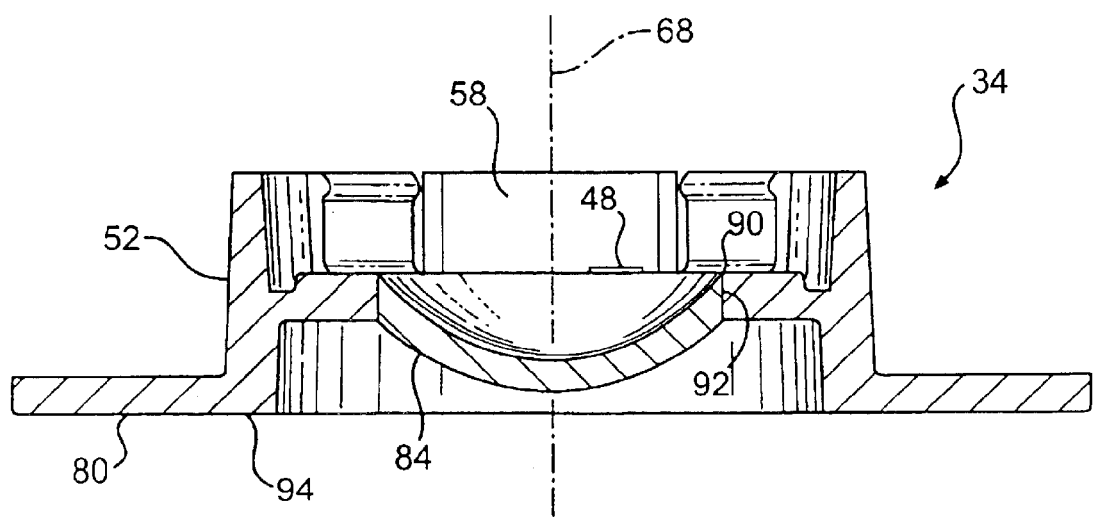
FIG. 7 is a cross-sectional view of the front curve mold half as shown in FIG. 3 taken along the line 7—7.

Second section 76 includes a pair of tabs 78 extending in opposite directions. These tabs are received in a mold tray (not shown) to align optical surface 40 in a predetermined rotational position about axis 68 and with respect to optical surface 42 (FIG. 5). Mold half 34 includes a similar pair of positioning tabs 80 (FIGS. 5 and 7). Tabs 78 and 80 may also be used to pull the mold halves apart to release a molded lends.

As should be understood by those skilled in this art, optical surfaces 40 and 42 may define spherical, toric and off-centered or decentered optical zones, as well as ballast and slab-off zones. Where a toric zone and a ballast zone are defined by different optical surfaces, mold halves 32 and 34 may be relatively rotated about axis 68 with respect to each other to achieve a desired angular offset between the toric zone and the ballast. The technique may also be applied to mold halves for making multifocal lenses.

Referring now to FIGS. 5 and 7, mold half 34 includes a first section 82 having a center section 84 defining concave optical surface 42. First section 82 also includes a plurality of tabs 86 from which protrusions 48 extend. As with first section 60 of mold half 32 (FIG. 4), first section 82 includes a tab 88 formed by solidified material between an injection gate and center section 84. Tab 88 may also be referred to as the gate.

Optical surface 42 defines an edge 90 centered about axis 68. Center section 84 defines a boundary 92 parallel to axis 68 and including edge 90. A second section 94 meets and completely surrounds boundary 92.

Figure 8:
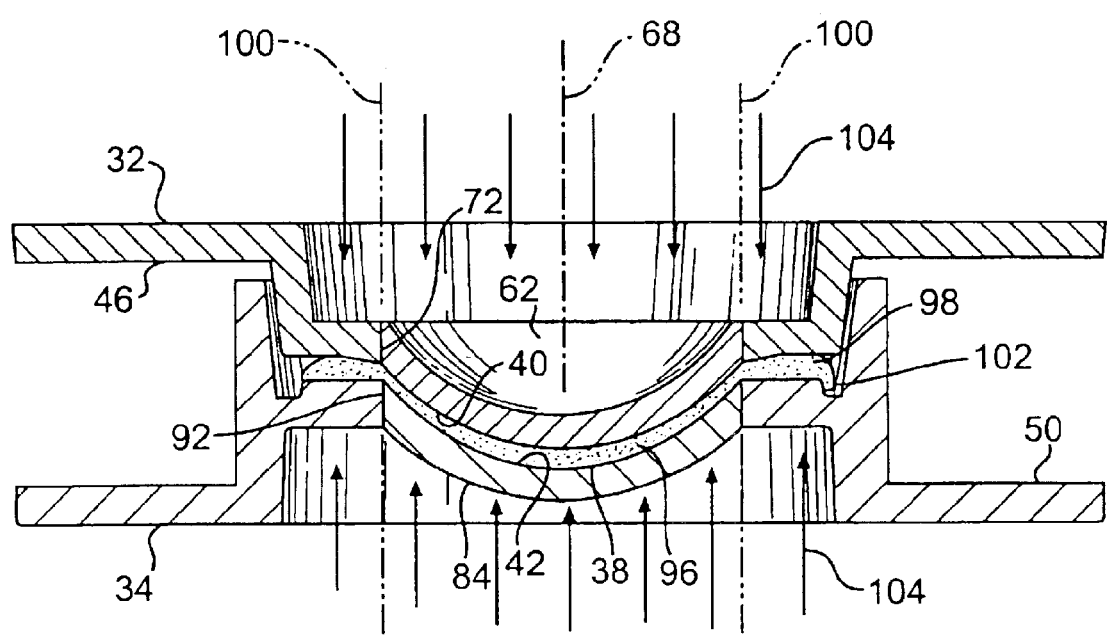
FIG. 8 is a cross-sectional view of the mold as in FIG. 3 operatively engaged.

Referring to FIGS. 3 and 8, when mold halves 32 and 34 are brought together, as indicated by arrow 36, and aligned with respect to each other by protrusions 44 and 48 and by protrusions 56 and collar 52, mold cavity 38 is formed between front side 46 of mold half 32 and front side 50 of mold half 34. Prior to assembly of the mold halves, a monomer material is deposited in concave optical surface 42. When the molds are assembled, convex optical surface 40 engages the monomer so that it fills the portion 96 of mold cavity 38 between the optical surfaces. Excess monomer is pushed radially outward into a second mold cavity portion 98 extending radially outward from a boundary 100 that includes boundaries 92 and 72. Cavity portion 98 includes an annular reservoir 102 to receive the excess monomer. As should be understood by those skilled in this art, while the thickness of center sections 62 and 84 may vary on the order of microns across their respective cross-sections, each defines a generally uniform thickness above and below their respective optical surfaces.

First section 62 and 84 are formed by a material that passes light used to cure the lens-forming material in mold cavity portion 96. It should be understood that the particular light (e.g. Ultraviolet, infrared, visible or other wavelength range) used to cure the lens will depend upon the characteristics of the lens-forming material. Thus, any light suitable to cure the lens should be understood to be within the meaning of "curing light" as used herein. Accordingly, while the mold as described herein is used in an ultraviolet light system, it should be understood that this is for exemplary purposes only and that molds within the scope of the present invention may be formed with respect to light in other wavelengths.

Referring again to the illustrated embodiment, first sections 62 and 84 are formed by a material such as polymethylmethacrylate (PMMA) that passes ultraviolet light. In one preferred embodiment, the first sections are made from HITACHI OPTOREZ, a birefringent-free PMMA available from Hitachi Chemical Company. Second sections 76 and 94, however, are formed from a UV-opaque material such as PMMA mixed with a pigment (e.g. carbon black) or a UV absorber or reflector. One exemplary UV-opaque material may comprise an impact modified acrylic including PMMA and butadiene or other rubber-like compound. In one preferred embodiment, the second sections are made from LUCITE SUPERTUF ST5068, an impact modified acrylic available from E. I. du Pont de Nemours and Company, mixed with carbon black pigment.

Generally, the second sections are UV-opaque in that they block passage of ultraviolet light, whether by absorption or reflection. Exemplary ultraviolet blockers that may be used within the present invention include screening agents, UV absorbers and excited state quenchers. UV screens are typically pigments, (such as carbon black) that absorb UV light, often absorb visible light, and transform the energy into infrared radiation. UV absorbers absorb UV light but absorb little, if any, visible light. They typically dispose of absorbed energy though heat or chemical changes. Excited-state quenchers convert energy produced by a reaction with photoexcited polymer molecules to infrared radiation.

Any suitable UV blocker may be used within the present invention. Exemplary UV absorbers include benzophenone, salicylate and benzotriazole. Commercially available benzotriazole absorbers include TINUVIN P, TINUVIN 326 and TINUVIN 1130, available from Novartis Corp., and ADK STAB LA 31, available from Asahi Denka. Derivatives of 2-hydroxy-benzophenone and hydroxy-benzotriazole, as well as phenylsalicylates, cyanoacrylates, O-hydroxyphenyl benzoltriazoles, resorcinol monobenzoate, phenol/resorcinol esters of tere- or isophthalic acids, may also be used. Suitable UV absorbers may include radical scavengers such as hindered phenols and piperidine derivatives. Excited-state quenchers include hindered amines and salts or chelates of cobalt, nickel or zinc.

Although not necessary, it is preferable that the materials of the respective first and second sections form a chemical bond with each other. Tables of such compatible materials from which the first and second sections of a mold half could b selected are provided below. The material combinations are rated according to their ability to adhere to one another, as measured by a mechanical stress test as should be understood by those skilled in this art. In each table, a "G" indicates that the materials exhibit good adhesion, while "M" and "P" indicate medium and poor adhesion, respectively. Preferable combinations are those materials exhibiting good or medium adhesion.

Whether or not a chemical bond is formed between the materials of the first and second sections, a mechanical lock may be formed between interengaging pieces of each section. For example, referring to FIGS. 4, 5 and 7, second section 76 of mold half 32 encapsulates tabs 64 and 66, and second section 94 of mold half 34 encapsulates tabs 48 and 86.

| THERMOPLASTIC ELASTOMERS (TPE) V. THERMOPLASTICS | Polypropylene (PP) | Nylon (PA) | Polystyrene (PS) | Acrylonitrile-Butadiene-Styrene (ABS) | Acetal (POM) | Polycarbonate (PC) | Polythylene Terephthalate (PET) | Polyester (PBT) | Polyvinyl Chloride (PVC) |
|---|---|---|---|---|---|---|---|---|---|
| TPE-S STYRENE BASE | G | M | M | M | P | P | P | P | P |
| TPE-O OLEFINIC BASE | G | M | P | P | P | P | P | P | P |

-continued

| | | | | | | | | | |
|---|---|---|---|---|---|---|---|---|---|
| TPE-A POLYAMIDE BASE | P | M | P | P | P | P | P | P | P |
| TPE-U URETHANE BASE | P | M | P | M | M | M | P | M | M |
| TPE-E POLYESTER BASE | P | M | P | P | P | P | M | M | P |

| BASIC PLASTICS | ABS | ACETAL | ACRYLIC | CELLULOSE-ACETATE | EVA | NYLON 6 | NYLON 66 | PET | POLYCARBONATE | POLY-ETHYLENE LD |
|---|---|---|---|---|---|---|---|---|---|---|
| ABS | G | — | G | G | — | — | — | G | G | M |
| ACETAL | — | G | — | — | — | — | — | — | — | M |
| ACRYLIC | G | — | G | — | — | — | — | — | — | M |
| CELLULOSE ACETATE | G | — | — | G | M | — | — | — | — | — |
| EVA | — | — | — | M | G | — | — | — | — | G |
| NYLON 6 | — | — | — | — | — | G | G | — | — | M |
| NYLON 66 | — | — | — | — | — | G | G | — | M | M |
| PET | G | — | — | — | — | — | — | G | — | — |
| POLYCARBONATE | G | — | — | — | — | — | M | — | G | — |
| POLYETHYLENE (Low Density) | M | M | M | — | G | M | M | — | — | G |
| POLYETHYLENE (High Density) | M | M | M | — | G | M | M | — | — | G |
| POLYPROPYLENE | M | M | M | — | G | M | M | — | — | G |
| POLYPHENYLENE OXIDE (PPO) | — | — | — | — | — | — | — | — | — | — |
| POLYSTYRENE (Gen. Purpose) | M | — | M | — | G | — | — | — | M | M |
| POLYSTYRENE High Impact | M | — | P | — | — | M | M | — | P | — |
| RIGID PVC | G | — | G | — | G | — | — | — | — | — |
| FLEXIBLE PVC | P | — | G | — | P | — | — | — | — | M |
| STYRENE ACRYLANITRILE (SAN) | G | — | G | — | — | — | — | G | G | — |

| BASIC PLASTICS | POLYETHYLENE HD | POLYPROPYLENE | POLYPROPYLENE OXIDE (PPO) | POLY-STYRENE GP | POLY-STYRENE HI | RIGID PVC | FLEXIBLE PVC | SAN |
|---|---|---|---|---|---|---|---|---|
| ABS | M | M | — | M | M | G | P | G |
| ACETAL | M | M | — | — | — | — | — | — |
| ACRYLIC | M | M | — | M | P | G | G | G |
| CELLULOSE ACETATE | — | — | — | — | — | — | — | — |
| EVA | G | G | — | P | — | G | P | — |
| NYLON 6 | M | M | — | — | M | — | — | — |
| NYLON 66 | M | M | — | — | M | — | — | — |
| PET | — | — | — | — | — | — | — | G |
| POLYCARBONATE | — | — | — | M | P | — | — | G |
| POLYETHYLENE (Low Density) | G | G | — | M | — | — | M | — |
| POLYETHYLENE (High Density) | G | P | — | M | — | — | — | — |
| POLYPROPYLENE | P | G | M | M | M | M | M | — |
| POLYPHENYLENE OXIDE (PPO) | — | M | G | G | G | — | — | M |
| POLYSTYRENE (Gen. Purpose) | M | M | G | G | G | — | M | M |
| POLYSTYRENE High Impact | — | M | G | G | G | — | M | M |
| RIGID PVC | — | M | — | — | — | G | G | — |
| FLEXIBLE PVC | — | M | — | M | M | G | G | G |
| STYRENE ACRYLANITRILE (SAN) | — | — | M | M | M | — | G | G |

Referring again to FIGS. 3 and 8, once the mold halves are assembled, collimated ultraviolet light 104 is directed to the back side of each mold half 32 and 34 parallel to axis 68. The opaque second section of each mold half is disposed completely about boundary 100 and therefore prevents passage of ultraviolet light 104 into cavity portion 98. As noted above, the UV-opaque material of either second section need not extend in a continuous ring about boundary 100. For example, a second mold half section can comprise. discontinuous curves disposed in parallel planes and aligned so that they completely block ultraviolet light in some area extending radially outward of boundary, 100 from passing through its mold half to the mold cavity. Thus, the second section may completely surround its respective central section at boundary 100 without being continuous at that boundary.

Because center sections 62 and 84 transmit ultraviolet light, ultraviolet light 104 passes to the mold cavity to cure the monomer in cavity section 96. Monomer in cavity section 98, however, is not cured and remains liquid. Boundary 100 defines the transition between the solid and liquid material and is precisely formed by the collimated light 104. Collimated light is preferred in that it provides a more precise transition than uncollimated light, but it should be understood that uncollimated light could be used. Once curing is complete and the mold halves are disassembled, remaining liquid monomer from cavity portion 98 may be rinsed away from the polymerized contact lens in cavity portion 96. The contact lens circumferential edge is defined at boundary 100.

Although both mold halves shown in FIG. 8 include a UV-transmissive and a UV-opaque section, it should be understood that where ultraviolet light is directed to the mold cavity from only one side, this construction need be present in only one of the mold halves.

Figure 9A:
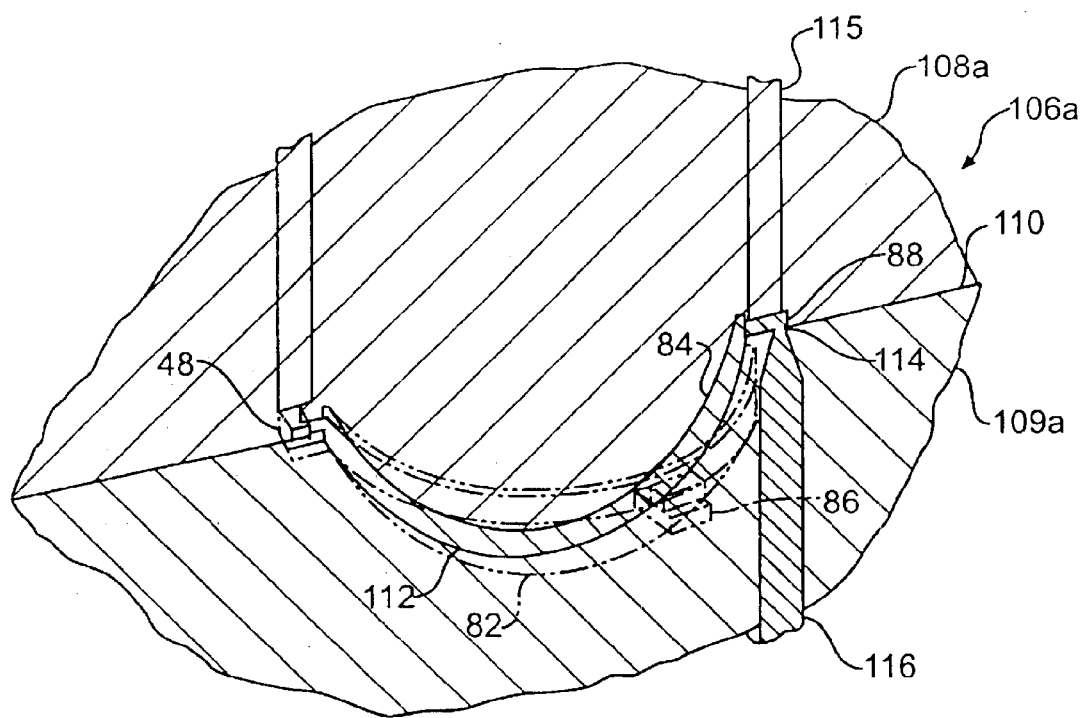
FIG. 9a is a cross-sectional illustration of a mold for making a first section of the front curve mold half as shown in FIG. 3 according to an embodiment of the method according to the present invention.
Figure 9B:
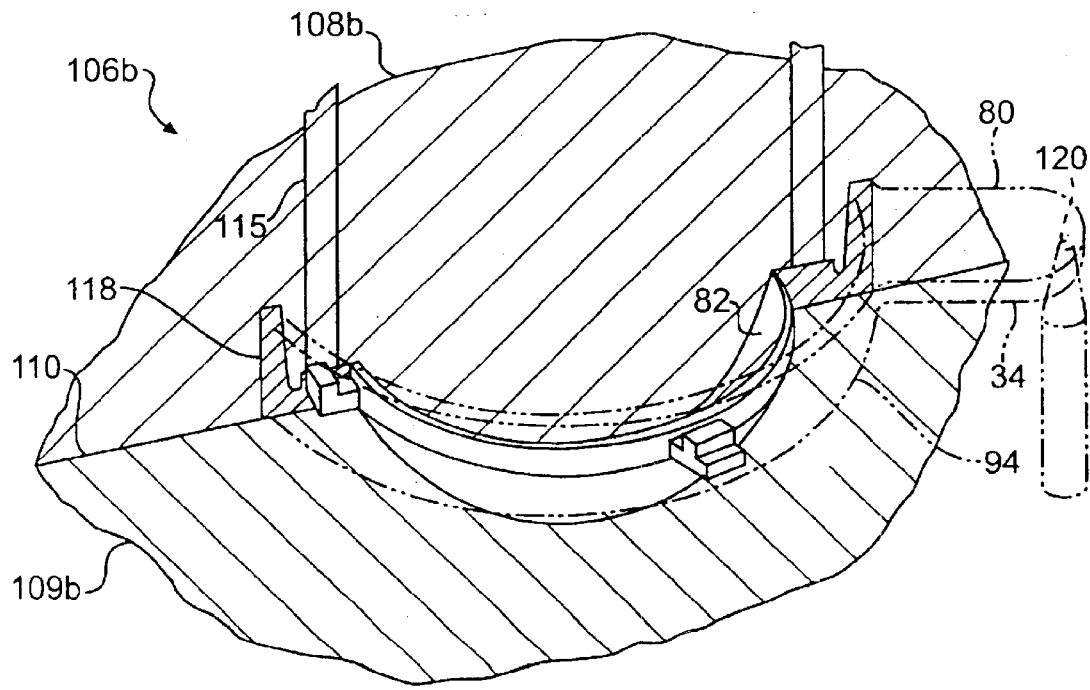
FIG. 9b is a cross-sectional illustration of a mold for forming a second section of the front curve mold half as shown in FIG. 3.

FIGS. 9A and 9B illustrate a first method of injection molding front curve mold half 34. A similar process is used for molding the back curve mold half and is therefore not discussed in detail herein. An injection molding machine 106a and 106b is, for purposes of clarity, indicated by first mold sections 108a and 108b and second mold sections 109a and 109b that are reciprocally movable to and away from their respective first mold sections. Injection molding machines should be familiar to those skilled in this art and are therefore not discussed in greater detail herein. Accordingly, while first mold sections 108a and 108b and second mold sections 109a and 109b are illustrated as continuous blocks, it should be understood that they may comprise any suitable configuration and components, including cavity blocks, inserts and cooling passages, as appropriate and as should be understood by those skilled in this art.

FIG. 9a illustrates first mold 106a in which first mold section 108a meets second mold section 109a at a parting line 110 to form a mold cavity 112 therebetween. Mold cavity 112 is shaped to form first section 82 of mold half 34. A cross-section of the molded mold half is indicated by cross hatching. The part of first section 82 extending forward out of the plane of the cross-section is indicated in phantom.

Molten UV-transmissive thermoplastic material is injected into mold cavity 112 through gate 114 of a cold runner 116 indicated schematically at 116. Cold runner could be replaced by a hot runner system, for example a valve-gated or hot tip system.

Thermoplastic material solidifying between the injection gate and center section 84 forms gate 88.

Once the thermoplastic material in cavity 112 has cooled, mold sections 108a and 109a are separated at parting line 110, and the first section 82 is removed from the core side to which it sticks by suitable ejection means, for example ejector pins pushing outward against tabs 86 or protrusions 48. Once removed from mold 106a, first section 82 is placed in a mold cavity 118 of a second mold 106b including reciprocally movable mold sections 108b and 109b. Mold cavity 118 extends radially outward from first section 82 to define second section 94 of mold half 34. Molten UV-opaque thermoplastic material is injected through a gate 120 into mold cavity 118 to form second section 94 to complete mold half 34. The part of second section 94 in the cross-sectional plane of FIG. 9b is indicated by cross hatching, and the part of second section 94 extending forward of the cross-section is indicated in phantom.

Preferably, the material used to form second section 94 should have a melt temperature lower than that of the material used to make first section 82, and the material injected into cavity 118 should be at a lower temperature than the melt temperature of the material of first section 82, so that first section.82 does not melt during the molding of second section 94. However, one polymer having the same melting temperature or polymers having similar melting temperatures can be used for the two (first and second) sections of the lens mold provided that the mold sections of the injection molding machine is equipped with an appropriately controllable cooling system that can provide different temperatures for the mold sections.

Figure 11:
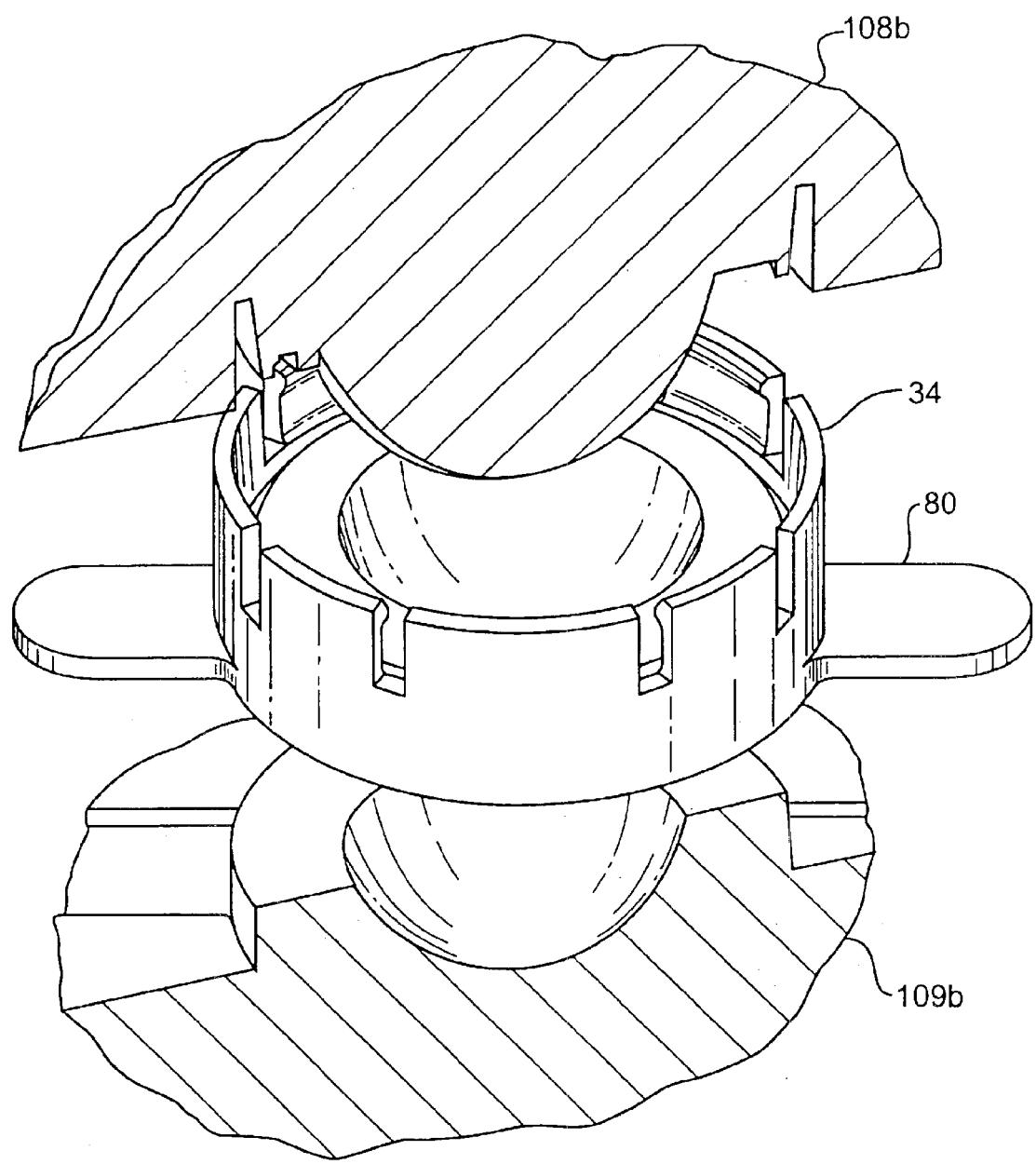
FIG. 11 is an exploded view of the mold and mold half as in FIG. 9b.

Once second section 94 has cooled, first mold section 108b and second mold section 109b are separated, and mold half 34 is removed from mold 106b by suitable ejection means, for example including ejector pins bearing on tabs 80. An exploded view of the mold 106b and mold half 34 is provided in FIG. 11. It is to be noted that the sequence of injection molding the first section and the second section of the lens mold can be reversed.

Referring to FIGS. 5, 10A, 10B and 10C, mold half 34 may be formed in a single mold using a two-shot technique. Mold 106 includes a first mold section 108 and a second mold section 109 that meet in a first configuration at a parting line 110 to form a mold cavity 112 shaped to define first section 82 of mold half 34. Molten UV-transmissive thermoplastic material is injected into cavity 112 through an injection gate 121 of a cold runner system, indicated at 123, radially offset from the center section of first section 82. As with the molds illustrated in FIGS. 9A and 9B, cold runner 123 may be replaced by a suitable hot-runner system.

Figure 10A:
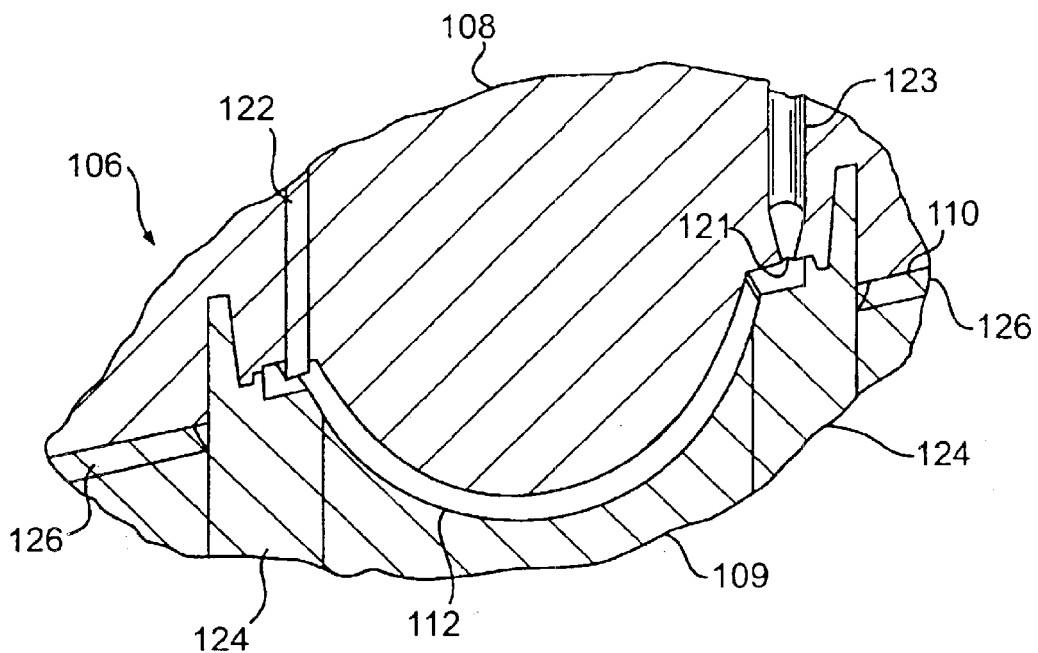
FIG. 10a is a cross-sectional illustration of a mold for making a front curve mold half according to an embodiment of the method according to the present invention.
Figure 10B:
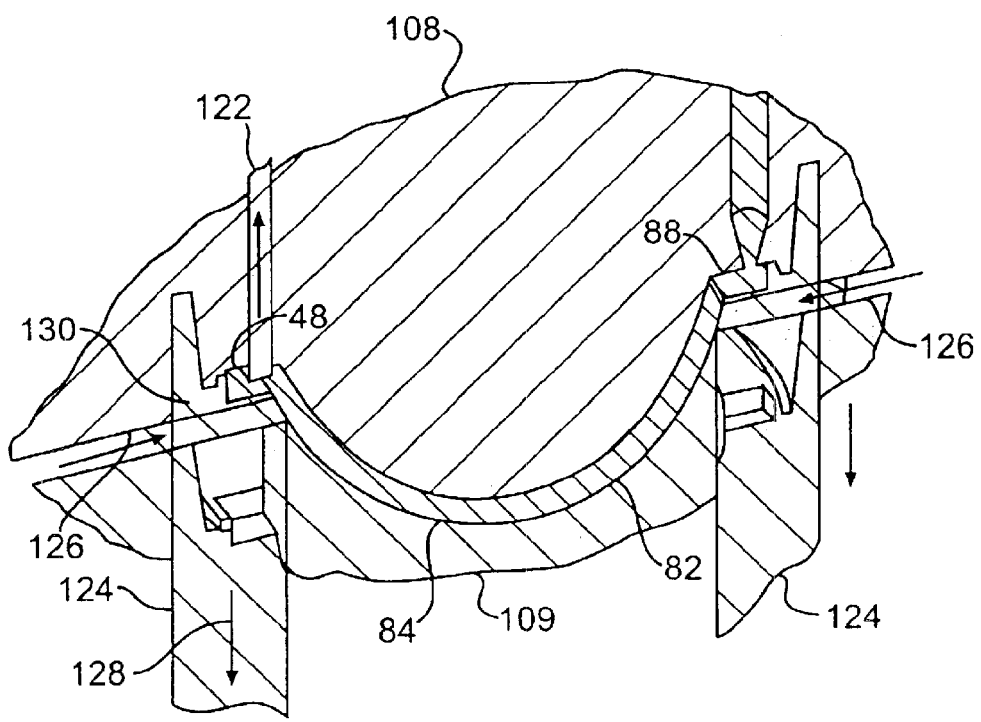

Mold section 108 includes three reciprocal sections 122 (one of which is shown in FIGS. 10A and 10B), each extending into the gap between a protrusion 48 and the center section 84 above one of the tabs 86. Each section 122 extends slightly laterally beyond its respective tab 86 on one or both sides. Second mold section 109 includes an axially movable section 124 and four radially movable sections 126 (two of which are shown in FIGS. 10A and 10B).

Referring specifically to FIG. 10B, when first section 82 cools, the three axially movable sections 122 are raised until their bottom surfaces become flush with the boundary of front sides 50 of mold half 34 (FIG. 3). Axially movable portion 124 of mold section 109 drops, as indicated by arrows 128, to open a cavity 130 shaped to define collar 52 (FIG. 3) and the portion of second section 82 extending from the collar to central section 84. Radially movable sections 126 are inwardly moved to define the back side of this cavity. Although not shown in FIG. 10B, mold section 108 includes cavities that open into cavity 130 when movable portion 124 drops to define the tabs 80 (FIGS. 3 and 5). One of the tabs 80 is shown in phantom in FIG. 10C.

Figure 10C:
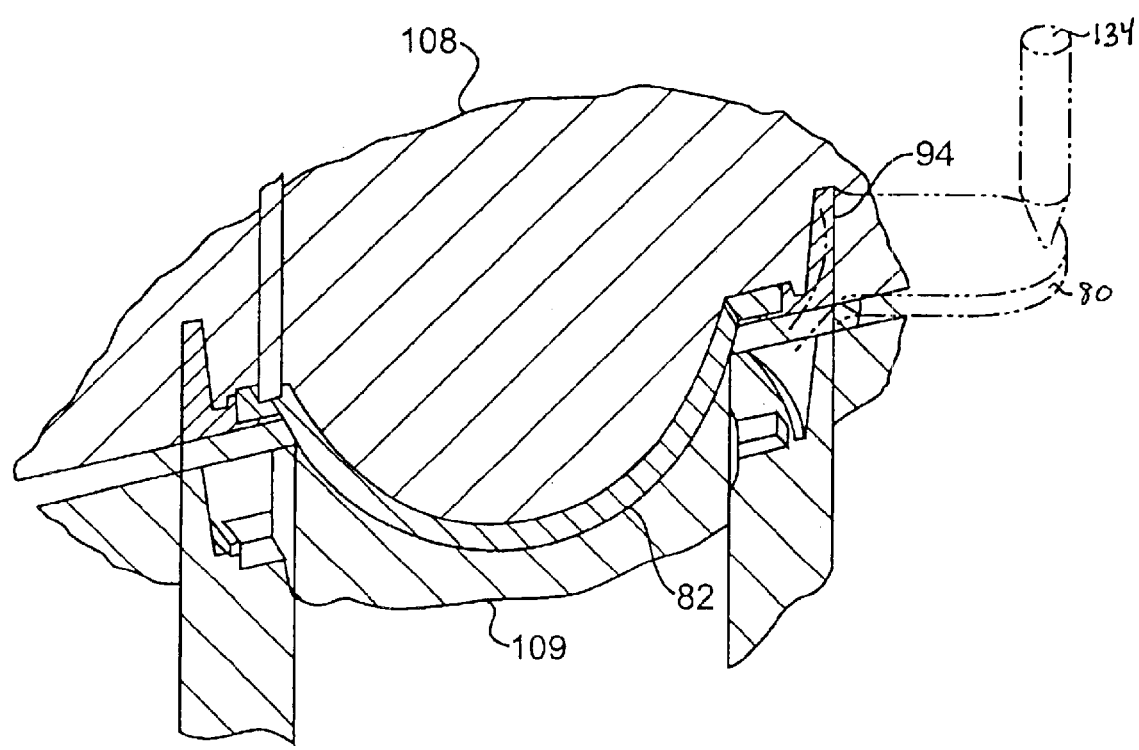

Accordingly, referring to FIG. 10C, the modified mold sections 108 and 109 define second section 94 radially outward of first section 82. Molten UV-opaque thermoplastic material is injected into this cavity through an injection gate 132 opening from a sprue 134 into one of the tabs 80 until the cavity 130 is filled. Once the second section has cooled, first mold section 108 and second mold section 109 are separated, and the molded mold half is removed by suitable ejection means.

Figure 2:
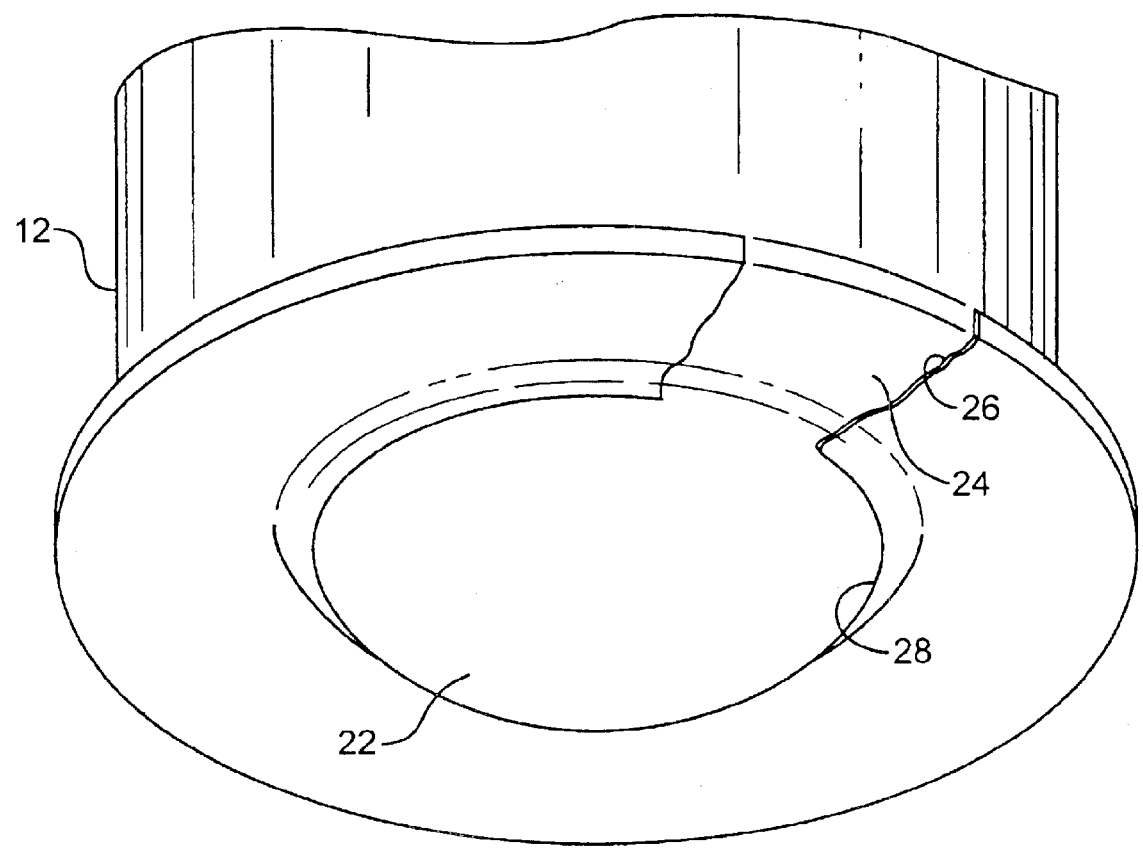
FIG. 2 is a partial cut away view of one of the mold halves as shown in FIG. 1.

While one or more preferred embodiments of the invention have been described above, it should be understood that any and all equivalent realizations of the present invention are included within the scope and spirit thereof. For example, a two-stage or two-shot mold may be used to form a mold having a shape as shown in FIGS. 1 and 2 out of thermoplastic materials. In the first stage or first shot, a cylindrical core having a diameter equal to that of edge 28 and formly the concave or convex optical surface is formed. In the second stage or second shot, a second section is formed extending radially outward from the boundary. Further, mold halves of the present invention may be formed from a thermoset material in a cast molding technique. Thus, the embodiments depicted are presented by way of example only and are not intended as limitations upon the present invention, and it should be understood by those of ordinary skill in this art that the present invention is not limited to such embodiments since modifications can be made. Therefore, it is contemplated that any and all such embodiments are included in the present invention as may fall within the literal or equivalent scope of the appended claims.

What is claimed is:

1. An ophthalmic lens mold, said mold comprising
   a first mold half having a front side and a back side, said front side defining an optical surface; and
   a second mold half having a front side defining an optical surface,
   wherein, upon alignment of said first mold half with respect to said second mold half so that said front sides oppose each other, an mold cavity is formed between said front sides to form an ophthalmic lens therein from a moldable material so that said optical surfaces form respective opposing optical surfaces of said ophthalmic lens, and
   wherein said first mold half includes
      a first section that transmits curing light from a light source and that extends from said back side to said front side, said first section including at least an area of said first mold half optical surface enclosed by an outermost circumference of said ophthalmic lens, and
      a second section co-molded with said first section and that blocks said curing light, said second section disposed with respect to said first section so that
      said second section prevents said curing light incident to said back side from passing through said first mold half into an area of said mold cavity that extends from said first mold half front side to said second mold half front side and that surrounds and extends radially outward of a boundary including said circumference, and
      said first section passes said incident curing light to an area of said mold cavity bounded by and within said boundary;
      wherein said first section includes polymethylmethacrylate and wherein said second section includes polymethylmethacrylate and butadiene.

2. The mold as in claim 1, wherein said first section optical surface is convex and wherein said first section forms a concave surface at said back side so that said first section defines a central section between said convex surface and said concave surface having a substantially uniform thickness.

3. The mold as in claim 2, wherein said second section extends from said first mold half front side to said first mold half back side.

4. The mold as in claim 2, wherein said first section includes at least one extension extending radially outward from said center section into said second section.

5. The mold as in claim 4, wherein said extension is an elongated tab.

6. The mold as in claim 1, wherein one of said first mold half and said second mold half includes a plurality of protrusions extending forward of said front side thereof to bear on the other of said first mold half and said second mold half upon said alignment of said first mold half and said second mold halt so that said front sides are spaced from each other to form said mold cavity.

7. The mold as in claim 6, wherein each of said first mold half and said second mold half includes a plurality of said protrusions, wherein said protrusions of said first mold half bear on said protrusions of said second mold half.

8. The mold as in claim 1, wherein one of said first mold half and said second mold half includes an annular collar that, upon said alignment of said first mold half and said second mold half, receives the other said mold half and aligns said optical surface of said other mold half with respect to said optical surface of said one of said first mold half and said second mold half.

9. The mold as in claim 1, wherein said second mold half includes a back side, a said first section and a said second section.

10. The mold as in claim 1, wherein said curing light is ultraviolet light.

11. The mold as in claim 1, wherein said curing light is collimated.

12. An ophthalmic lens mold, said mold comprising;
   a first mold half having a center section defining an optical surface having a circular circumferential edge; and
   a second mold half having a center section of substantially defining an optical surface,
   wherein one of said optical surfaces is convex and the other of said optical surfaces is concave,
   wherein, upon alignment of said first mold half with respect to said second mold half so that said optical surfaces oppose each other, a mold cavity is formed between said mold halves to form an ophthalmic lens therein from a moldable material so that said optical surfaces form respective opposing optical surfaces of said ophthalmic lens, and
   wherein said first mold half includes
      a first section that transmits curing light from a light source and that includes at least said first mold half center section, and
      a second section co-molded with said first section and that blocks said curing light, said second section surrounding said first section so that said second section prevents said curing light from passing through said first mold half into an area of said mold cavity that extends radially outward of a boundary parallel to said axis and including said circumferential edge and so that said first section passes said curing light to an area of said mold cavity bounded by and within said boundary;
   wherein said first section includes polymethylmethacrylate said second section includes polymethylmethacrylate and butadiene.

13. The mold as in claim 12, wherein said center section has a substantially uniform thickness.

14. The mold as in claim 12, wherein said first section includes at least one extension extending radially outward from said center section into said second section.

15. The mold as in claim 12, wherein
   one of said first mold half and said second mold half includes an annular collar that, upon said alignment of said first mold half and said second mold half, receives the other said mold half and aligns said optical surface of said other mold half with respect to said optical surface of said one of said first mold half and said second mold half, and at least one of said first mold half and said second mold half includes protrusions extending therefrom to space said mold halves from each other to form said mold cavity upon said alignment of said first mold half with said second mold half.

16. The mold as in claim 15, wherein said other mold half includes a plurality of protrusions that extend radially therefrom and, upon said alignment of said first mold half and said second mold half, bear on said collar.

17. The mold as in claim 12, wherein said second mold center section has a circular circumferential edge of an equal diameter as said first mold half center section circumferential edge, and wherein said second mold half includes a said first section and a said second section.

18. The mold as in claim 12, wherein said curing light is ultraviolet.

19. The mold as in claim 12, wherein said curing light is collimated.

20. An ophthalmic lens mold, said mold comprising:

a first mold half having a center section defining an optical surface having a circular circumferential edge; and a second mold half having a center section defining an optical surface;

wherein one of said optical surfaces is convex and the other of said optical surfaces is concave, wherein, upon alignment of said first mold half with respect to said second mold half so that said optical surfaces oppose each other, a mold cavity is formed between said mold halves to form an ophthalmic lens therein from a moldable material so that said optical surfaces form respective opposing optical surfaces of said ophthalmic lens, wherein said first mold half includes
a first section that transmits curing light and that includes said first mold half center section, and
a second section co-molded with said first section and that blocks said light, said second section surrounding said first section so that said second section prevents collimated said curing light from passing through said first mold half parallel to the axis of said circumferential edge into an area of said mold cavity that extends radially outward of a boundary parallel to said axis and includes said circumferential edge and so that said first section passes said collimated light to an area of said mold cavity bounded by and within said boundary, wherein said first section includes at least one extension extending radially outward from said center section into said second section, and wherein one of said first mold half and said second mold half includes an annular collar that, upon said alignment of said first mold half and said second mold half, receives the other said mold half and aligns said optical surface of said other mold half with respect to said optical surface of said one of said first mold half and said second mold half;

wherein said first section includes polymethylmethacrylate said second section includes polymethylmethacrylate and butadiene.

* * * * *